(12) United States Patent
Neuman

(10) Patent No.: US 9,459,471 B1
(45) Date of Patent: Oct. 4, 2016

(54) EYEGLASS WITH A SHIELD

(71) Applicant: Jay Neuman, New York, NY (US)

(72) Inventor: Jay Neuman, New York, NY (US)

( * ) Notice: Subject to any disclaimer, the term of this patent is extended or adjusted under 35 U.S.C. 154(b) by 0 days.

(21) Appl. No.: 14/734,689

(22) Filed: Jun. 9, 2015

(51) Int. Cl.
| | |
|---|---|
| G02C 7/10 | (2006.01) |
| G02C 7/16 | (2006.01) |
| G02C 11/00 | (2006.01) |
| G02C 5/00 | (2006.01) |

(52) U.S. Cl.
CPC .................. *G02C 7/16* (2013.01); *G02C 5/001* (2013.01); *G02C 11/12* (2013.01)

(58) Field of Classification Search
CPC .................................. G02C 7/104; G02C 9/04
USPC ........ 351/44, 158, 155, 41, 47, 57; 2/12, 13, 2/427, 428, 429, 431, 449, 450
See application file for complete search history.

(56) References Cited

U.S. PATENT DOCUMENTS

| | | | | |
|---|---|---|---|---|
| 3,011,170 A | * | 12/1961 | Lutz .......................... | G02C 7/16 2/13 |
| 5,189,445 A | | 2/1993 | Stagner | |
| 5,264,875 A | * | 11/1993 | Cooper ................... | A61F 9/029 351/44 |
| 5,335,025 A | * | 8/1994 | Wang ....................... | G02C 7/10 2/13 |
| 5,438,378 A | * | 8/1995 | Blatter ..................... | G02C 9/02 2/13 |
| 6,910,767 B2 | | 6/2005 | Froissard | |
| 7,862,165 B2 | | 1/2011 | Hobbs | |

FOREIGN PATENT DOCUMENTS

JP          04342226          * 11/1992

* cited by examiner

*Primary Examiner* — Hung Dang
(74) *Attorney, Agent, or Firm* — Crossley & Stevenson Intellectual Property Law

(57) ABSTRACT

An eyeglass with a shield including an eyeglass, a shield, and a pair of slots. The shield has a continuous top member and a pair of side members. The top member of the shield is continuously disposed on a top edge of a pair of lenses, and a right side member and a left side member of the pair of side members is continuously disposed on a right edge of a right lens and a left edge of a left lens, respectively. A right slot and a left slot of the pair of slots are disposed within a back edge of the right side member and the left side member of the shield, respectively. A front end of each of a right arm and a left arm of the eyeglass is disposed within the right slot and the left slot, respectively.

4 Claims, 3 Drawing Sheets

EYEGLASS WITH A SHIELD

BACKGROUND OF THE INVENTION

Various types of eyeglasses are known in the prior art. However, what has been needed is an eyeglass with a shield including an eyeglass, a shield, and a pair of slots. What has been further needed is for the shield to have a continuous top member and a pair of side members, with the top member of the shield continuously disposed on a top edge of a pair of lenses and a right side member and a left side member of the pair of side members continuously disposed on a right edge of a right lens and a left edge of a left lens, respectively. Lastly, what has been needed is for a right slot and a left slot of the pair of slots to be disposed within a back edge of the right side member and the left side member of the shield, respectively, with a front end of each of a right arm and a left arm disposed within the right slot and the left slot, respectively. The eyeglass with a shield thus assists a user in blocking out peripheral distractions while reading or completing a task that requires the user to focus on an object directly in front of him. Furthermore, the pair of lenses can be produced in varying shapes and sizes to accommodate the user's preferences.

FIELD OF THE INVENTION

The present invention relates to eyeglasses, and more particularly, to an eyeglass with a shield.

SUMMARY OF THE INVENTION

The general purpose of the present eyeglass with a shield, described subsequently in greater detail, is to provide an eyeglass which has many novel features that result in an eyeglass with a shield which is not anticipated, rendered obvious, suggested, or even implied by prior art, either alone or in combination thereof.

To accomplish this, the present eyeglass with a shield includes an eyeglass, a shield, and a pair of slots. The eyeglass has an eyeglass frame, a pair of hinged arms, and a pair of lenses. The pair of hinged arms includes a right arm and a left arm. The pair of lenses includes a right lens and a left lens. Each of the right lens and the left lens has a top edge, a right edge, and a left edge. The shield has a continuous top member and a pair of side members. The pair of side members includes a right side member and a left side member. Each of the top member and the pair of side members of the shield has a front edge, a back edge, an interior surface, and an exterior surface.

The interior surface of the top member of the shield proximal the back edge is continuously disposed from the top edge of the right lens to the top edge of the left lens. The interior surface of the right side member and the left side member is continuously disposed on the right edge of the right lens and the left edge of the left lens, respectively. The right side member and the left side member of the shield are both perpendicularly disposed with the top member of the shield. A width of the shield is optionally in a range of two inches to seven inches.

The pair of slots includes a right slot and a left slot. Each of the right slot and the left slot is disposed within the back edge of the right side member of the shield and the left side member of the shield, respectively, proximal the top member of the shield. A front end of each of the right arm of the eyeglass and the left arm of the eyeglass is disposed within the right slot and the left slot, respectively.

Thus has been broadly outlined the more important features of the present eyeglass with a shield so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 4 thereof, an example of the instant eyeglass with a shield employing the principles and concepts of the present eyeglass with a shield and generally designated by the reference number 10 will be described.

Figure 1:
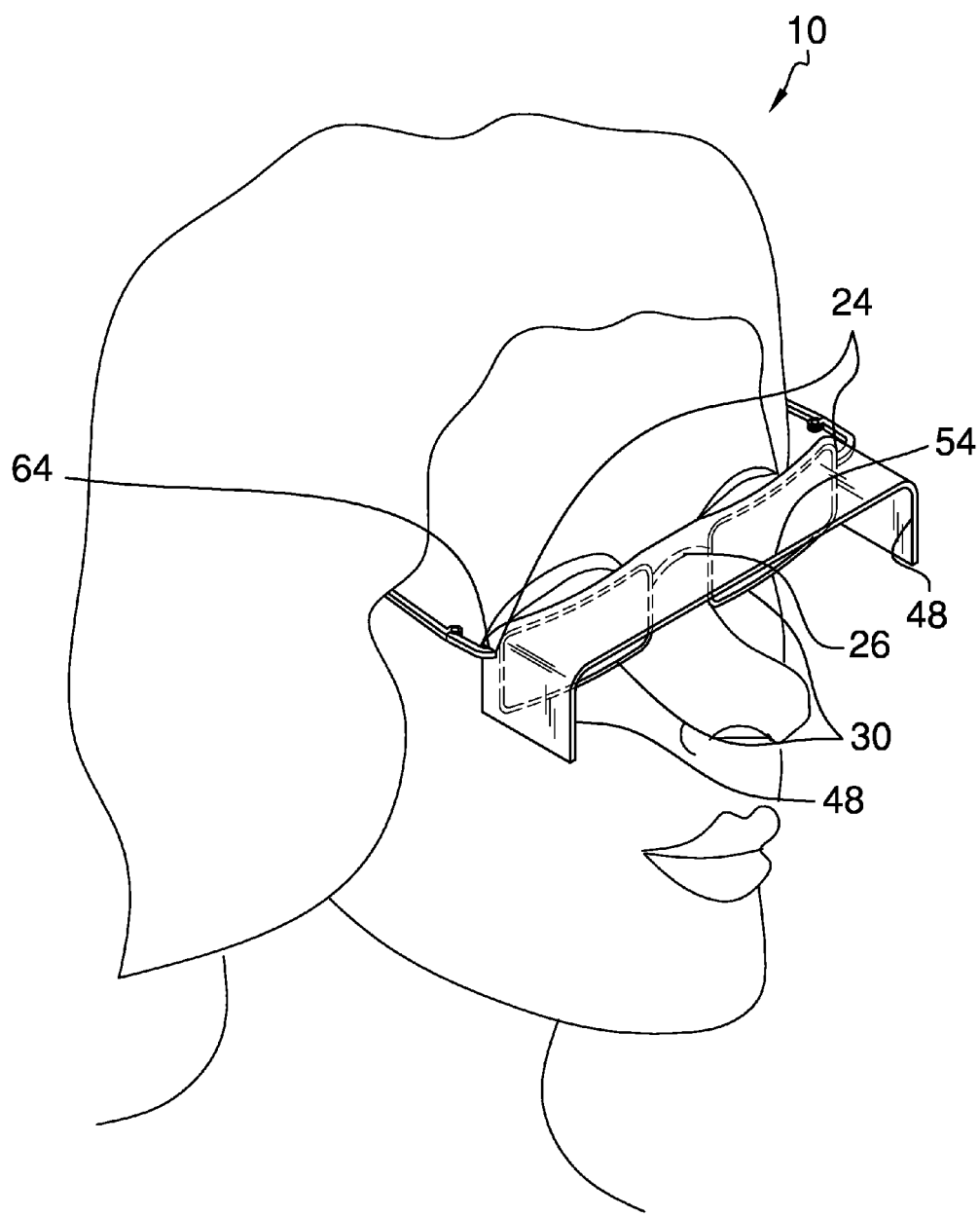
FIG. 1 is an in-use view.
Figure 2:
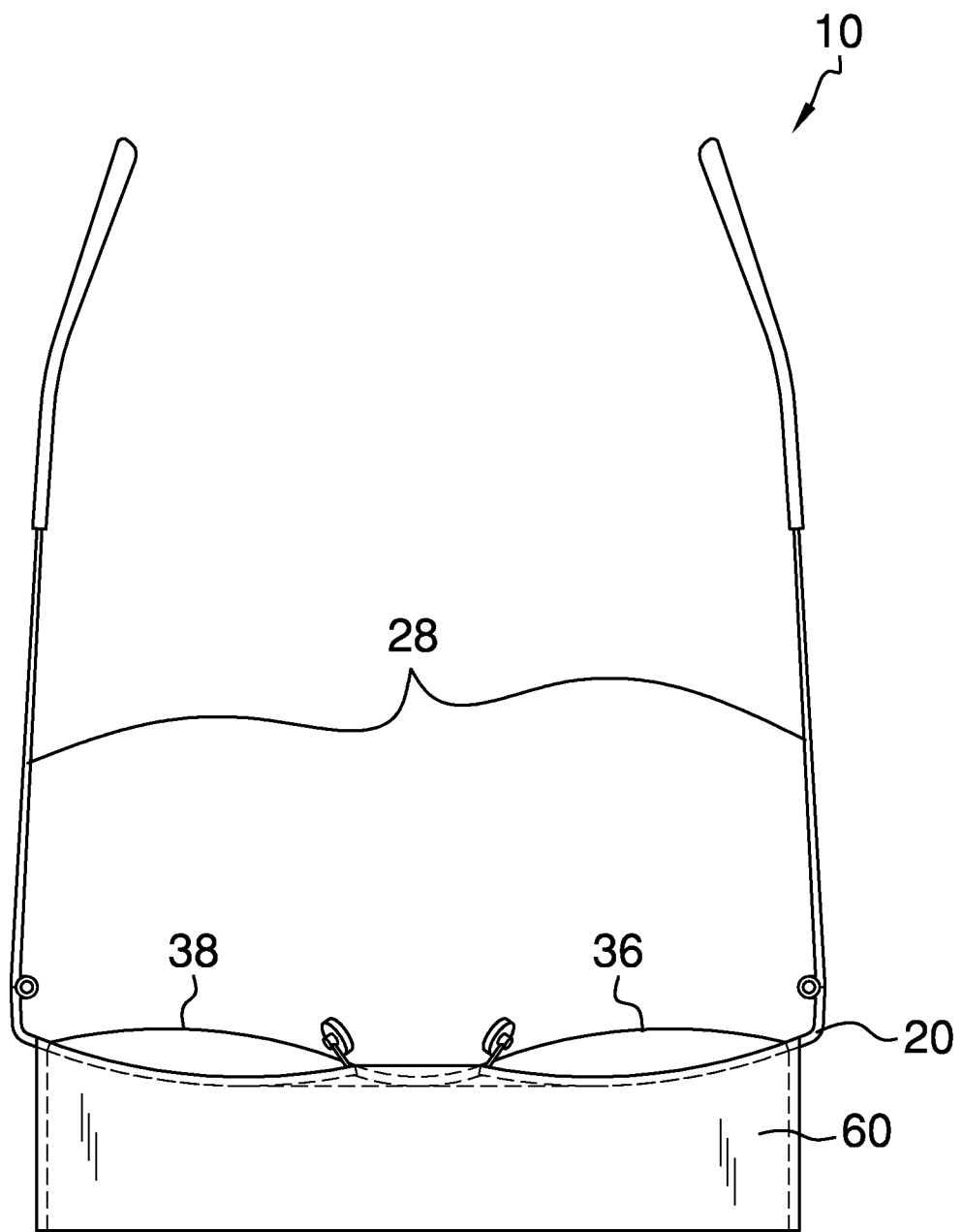
FIG. 2 is a top plan view.
Figure 3:
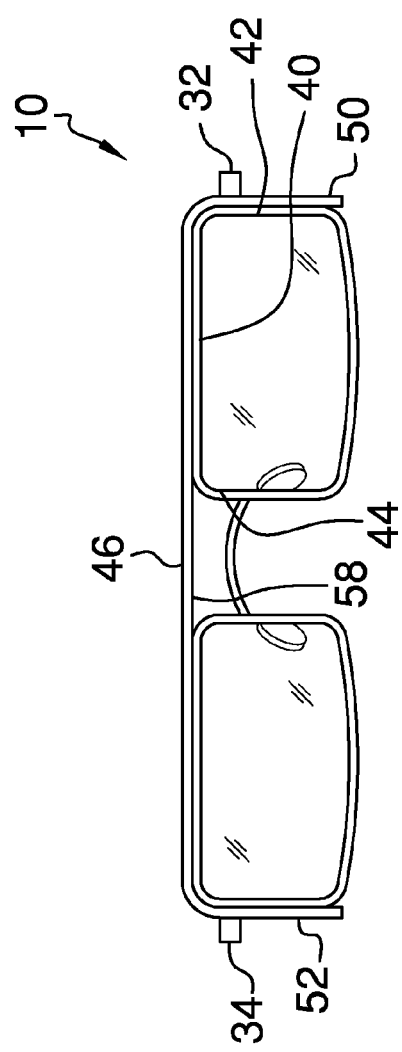
FIG. 3 is a front elevation view.
Figure 4:
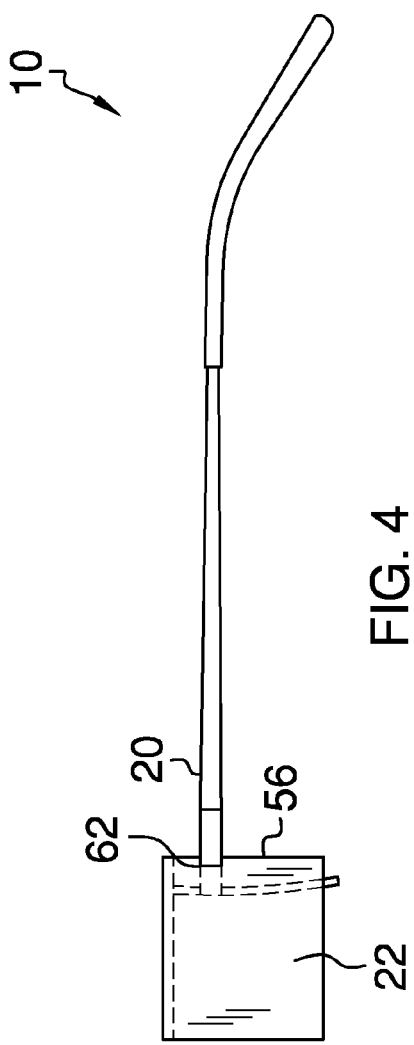
FIG. 4 is a side elevation view.

Referring to FIGS. 1 through 4 the present eyeglass with a shield 10 is illustrated. The eyeglass with a shield 10 includes an eyeglass 20, a single continuous rectangular shield 22, and a pair of slots 24. The eyeglass 20 has an eyeglass frame 26, a pair of hinged arms 28, and a pair of lenses 30. The pair of hinged arms 28 includes a right arm 32 and a left arm 34. The pair of lenses 30 includes a right lens 36 and a left lens 38. Each of the right lens 36 and the left lens 38 has a top edge 40, a right edge 42, and a left edge 44. As shown in FIGS. 1 and 3, the pair of lenses 30 is optionally substantially rectangular. The shield 22 has a continuous top member 46 and a pair of side members 48. The pair of side members 48 includes a right side member 50 and a left side member 52. Each of the top member 46, the right side member 50, and the left side member 52 of the shield 22 has a front edge 54, a back edge 56, an interior surface 58, and an exterior surface 60.

The interior surface 58 of the top member 46 of the shield 22 proximal the back edge 56 is continuously disposed from the top edge 40 of the right lens 36 to the top edge 40 of the left lens 38. The interior surface 58 of the right side member 50 and the left side member 52 is continuously disposed on the right edge 42 of the right lens 36 and the left edge 44 of the left lens 38, respectively. The right side member 50 and the left side member 52 of the shield 22 are both perpendicularly disposed with the top member 46 of the shield 22.

The pair of slots 24 includes a right slot 62 and a left slot 64. Each of the right slot 62 and the left slot 64 is disposed within the back edge 56 of the right side member 50 of the shield 22 and the left side member 52 of the shield 22, respectively, proximal the top member 46 of the shield 22. A front end 66 of each of the right arm 32 of the eyeglass 20 and the left arm 34 of the eyeglass 20 is disposed within the right slot 62 and the left slot 64, respectively.

What is claimed is:
1. An eyeglass with a shield comprising:
an eyeglass having an eyeglass frame, a pair of hinged arms comprising a right arm and a left arm, and a pair of lenses comprising a right lens and a left lens, each of the right lens and the left lens having a top edge, a right edge, and a left edge;
a single continuous rectangular shield having a continuous top member and a pair of side members comprising a right side member and a left side member, each of the top member, the right side member, and the left side member has a front edge, a back edge, an interior surface, and an exterior surface, wherein the interior surface of the shield top member proximal the back edge is continuously disposed from the top edge of the right lens to the top edge of the left lens, wherein the interior surface of the right side member and the left side member is continuously disposed on the right edge of the right lens and the left edge of the left lens, respectively;

wherein the shield right side member is perpendicularly disposed with the shield top member;

wherein the shield left side member is perpendicularly disposed with the shield top member; and a pair of slots comprising a right slot and a left slot, each of the right slot and the left slot disposed within the back edge of the shield right side member and the shield left side member, respectively, proximal the shield top member, wherein a front end of each of the right arm of the eyeglass and the left arm of the eyeglass is disposed within the right slot and the left slot, respectively.

2. The eyeglass with a shield of claim 1 wherein the pair of lenses is substantially rectangular.

3. The eyeglass with a shield of claim 1 wherein a width of the shield is in a range of two inches to seven inches.

4. An eyeglass with a shield comprising:

an eyeglass having an eyeglass frame, a pair of hinged arms comprising a right arm and a left arm, and a pair of lenses comprising a right lens and a left lens, each of the right lens and the left lens having a top edge, a right edge, and a left edge;

wherein the pair of lenses is substantially rectangular;

a shield having a continuous top member and a pair of side members comprising a right side member and a left side member, each of the top member, the right side member, and the left side member has a front edge, a back edge, an interior surface, and an exterior surface, wherein the interior surface of the shield top member proximal the back edge is continuously disposed from the top edge of the right lens to the top edge of the left lens, wherein the interior surface of the right side member and the left side member is continuously disposed on the right edge of the right lens and the left edge of the left lens, respectively;

wherein the shield right side member is perpendicularly disposed with the shield top member;

wherein the shield left side member is perpendicularly disposed with the shield top member;

wherein a width of the shield is in a range of two inches to seven inches; and a pair of slots comprising a right slot and a left slot, each of the right slot and the left slot disposed within the back edge of the shield right side member and the shield left side member, respectively, proximal the shield top member, wherein a front end of each of the right arm of the eyeglass and the left arm of the eyeglass is disposed within the right slot and the left slot, respectively.

* * * * *